W. J. THOMPSON.
TRANSMISSION AND GEAR SHIFTING MEANS.
APPLICATION FILED JAN. 5, 1918.
1,290,518.
Patented Jan. 7, 1919.
3 SHEETS—SHEET 1.
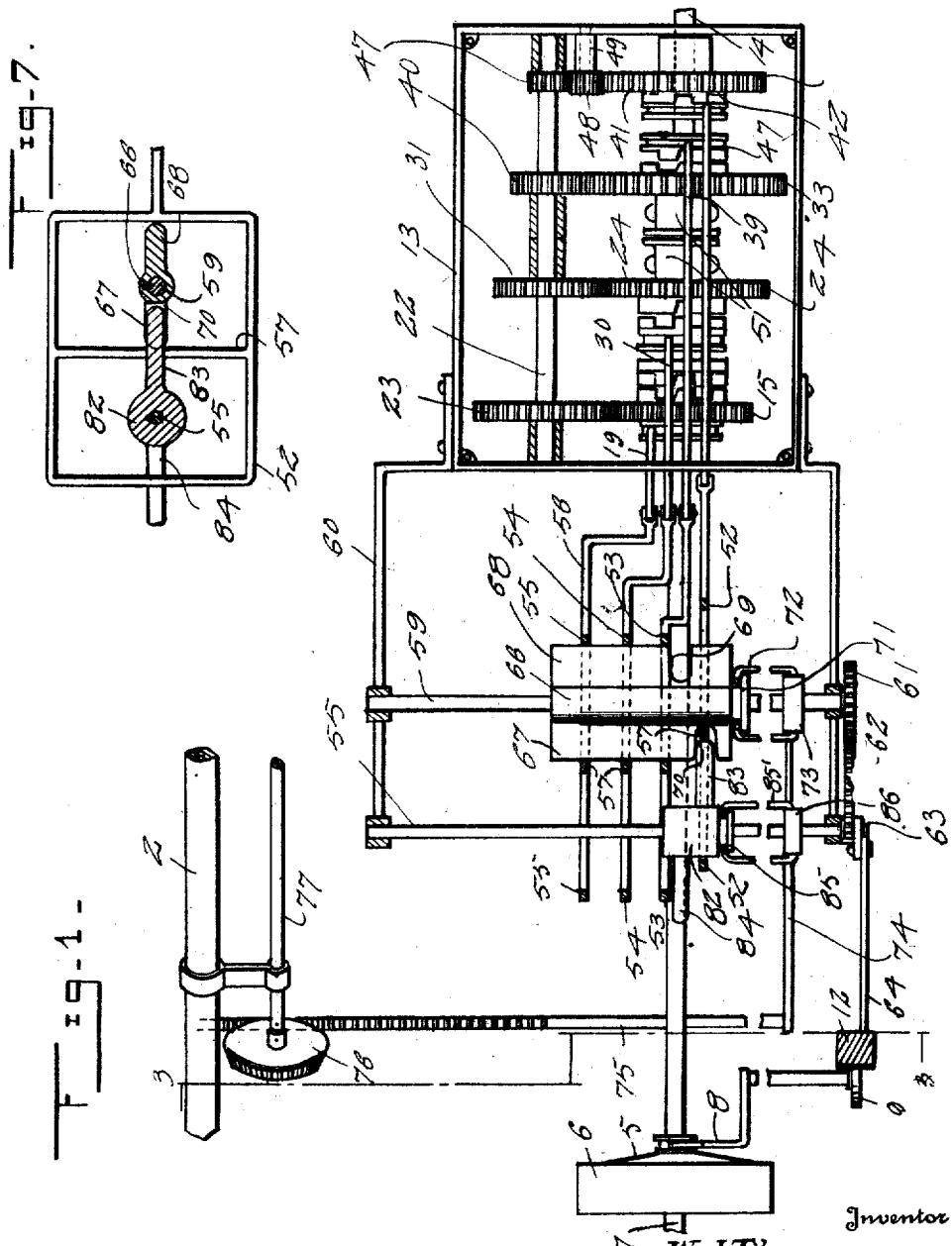
Inventor
W. J. Thompson

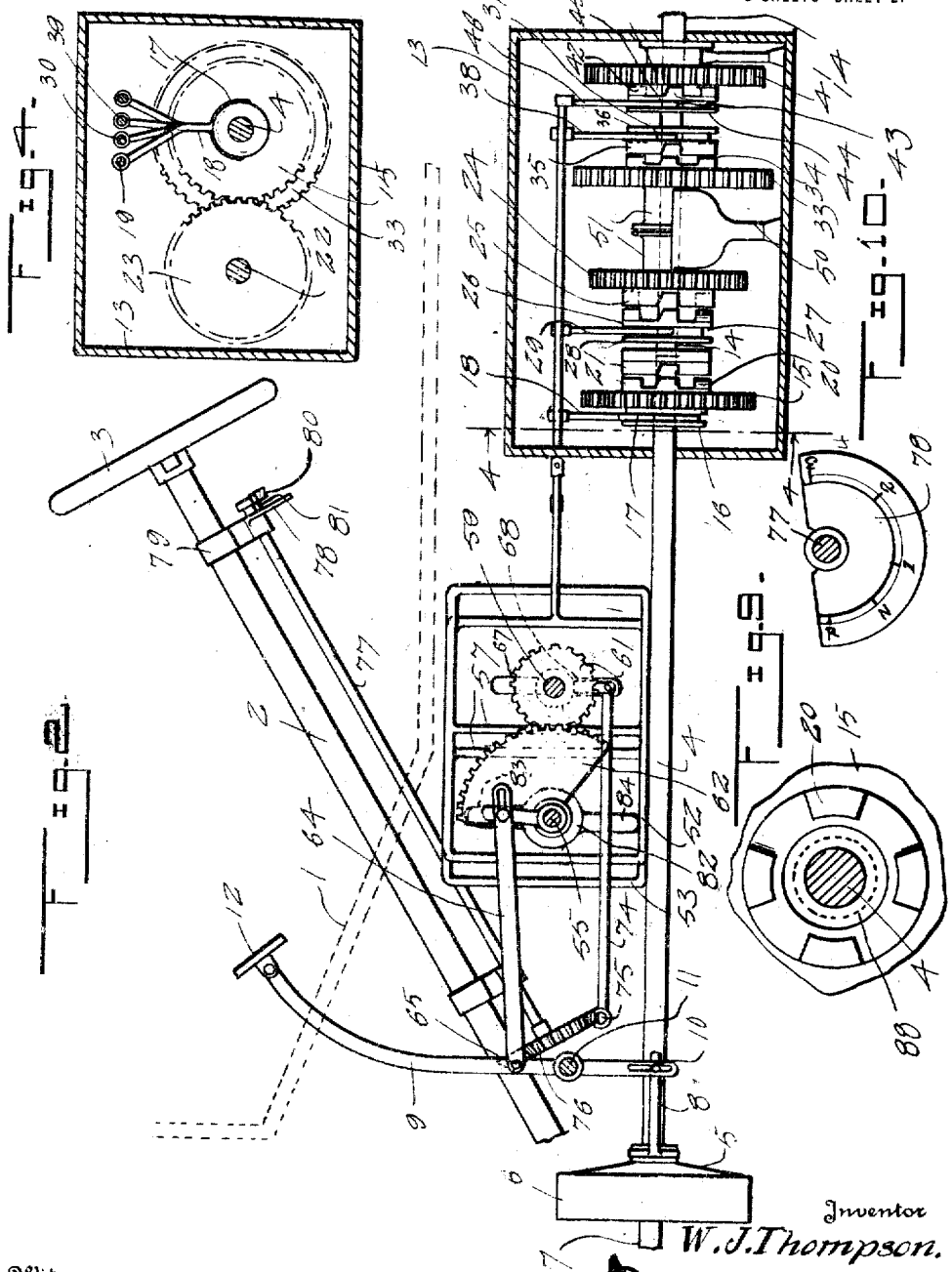

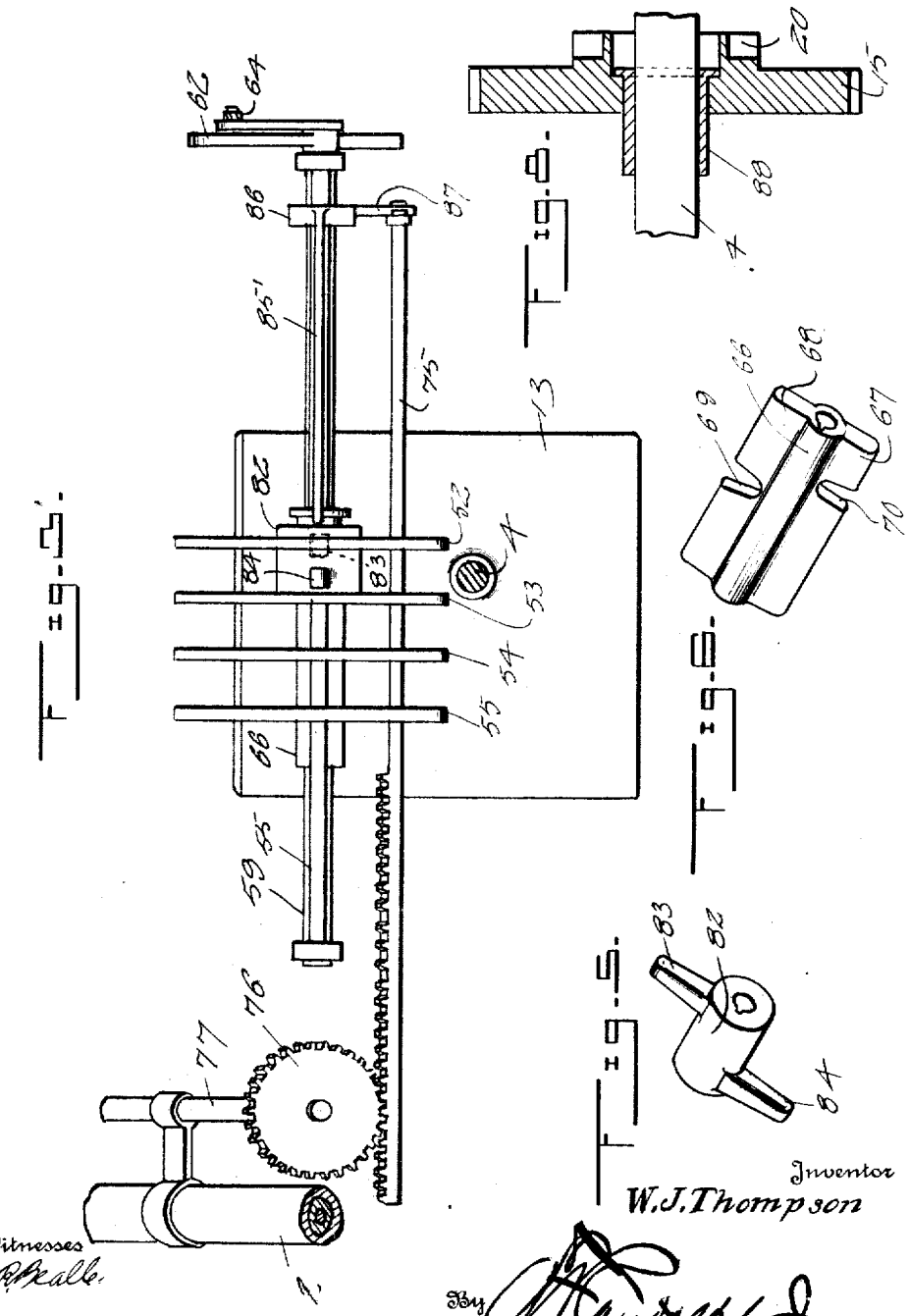

UNITED STATES PATENT OFFICE.

WILLIAM J. THOMPSON, OF MINNEAPOLIS, MINNESOTA.

TRANSMISSION AND GEAR-SHIFTING MEANS.

1,290,518.  Specification of Letters Patent.  Patented Jan. 7, 1919.

Application filed January 5, 1918. Serial No. 210,481.

*To all whom it may concern:*

Be it known that I, WILLIAM J. THOMP-SON, a citizen of the United States, residing at Minneapolis, in the county of Hennepin and State of Minnesota, have invented certain new and useful Improvements in Transmissions and Gear-Shifting Means; and I do hereby declare the following to be a full, clear, and exact description of the invention, such as will enable others skilled in the art to which it appertains to make and use the same.

This invention relates to improvements in transmissions and gear shifting means and has for one of its objects the provision of a device of this character wherein the speed changing gears will be constantly in mesh so as to obviate the wear upon gears in transmissions of the type that the gears are engaged and disengaged from each other to obtain the various speeds.

Another object of this invention is the provision of a gear shifting means which can be conveniently manipulated by a controlling means in close proximity to the operator and upon actuation of the clutch mechanism.

A further object of this invention is the provision of transmission and gear shifting means of the above stated character which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 1 is a plan view partly in section of an automobile transmission and gear shifting means constructed in accordance with my invention.

Fig. 2 is a horizontal sectional view of the same.

Fig. 3 is a transverse sectional view taken on the line 3—3 of Fig. 1.

Fig. 4 is a transverse sectional view taken on the line 4—4 of Fig. 2.

Fig. 5 is a perspective view of a member for moving the various clutches of the transmission into operative position.

Fig. 6 is a similar view of a member for moving the clutches of the transmission into inoperative or neutral position.

Fig. 7 is a detail sectional view illustrating the members in operative position.

Fig. 8 is a vertical sectional view of one of the speed changing gears illustrating the clutch element thereon.

Fig. 9 is a plan view of a clutch element adapted for coöperation with a clutch upon a gear.

Fig. 10 is a plan view of the quadrant.

Referring in detail to the drawings, the numeral 1 indicates a fragmentary portion of an automobile body having a steering column 2 mounted thereon to which is associated a steering wheel 3.

Underlying the automobile body 1 is a drive shaft 4 carrying a clutch element 5 adapted to engage a clutch element 6 carried by the crank shaft 7 of a prime mover. A yoke 8 is connected to the clutch element 5 and pivotally and slidably connected to the lower end of a foot pedal 9 as illustrated at 10. The foot pedal 9 is pivotally mounted as illustrated at 11 and has its upper end with the foot rest 12 thereon disposed above the floor boards of the automobile body 1 so that the operator can readily disengage the clutch element 5 from the clutch element 6 by pushing downwardly upon the clutch pedal so as to stop the crank shaft of the prime mover from driving the drive shaft 4. The foregoing description relates to a well known construction of automobile and to which my invention is applied.

A transmission casing or housing 13 is located under the automobile body 1 and receives the rear end of the drive shaft 4 within a suitable grounding. A driven shaft 14 is journaled in the transmission housing 13 and has its forward end disposed in close proximity to the rear end of the drive shaft 4 and has its other end disposed exteriorly of the housing 13 for connection with an ordinary differential of an automobile (not shown). A gear 15 is splined to the rear end of the drive shaft 4 within the transmission housing 13 and has formed thereon a grooved member 16 which receives a yoke 17 formed upon a vertically disposed arm 18. The vertically disposed arm 18 is connected to a rod 19 that extends from the front wall of the transmission housing 13. A clutch element 20 is formed upon the gear 15 and is adapted to engage the clutch element 21 secured to the forward end of the driven shaft 14 whereby upon movement of the clutch element 20 in engagement with the clutch element 21 a direct drive or high speed to the transmission will be obtained as the drive shaft 4 will be connected directly to the driven shaft 14. A counter shaft 22 is journaled in suitable bearings in the end walls of the transmission housing 13 and extends in spaced parallel relation to the drive and driven shafts. A gear 23 is secured to the forward end of the counter shaft 22 and is adapted to be driven by the gear 15 when in its forward or neutral position. The gears 15 and 23 are of substantially the same ratio so that the counter shaft will be driven substantially the same rate as the drive shaft 4. A gear 24 of a slightly larger dimension than the gear 15 is journaled to the driven shaft 14 at a point adjacent its forward end and has formed thereon a clutch element 25 which is adapted to be engaged by a clutch element 26 that is splined to the forward end of the driven shaft 14. The clutch element 26 has formed thereon a grooved member 27 which is engaged by a yoke 28 formed upon a vertically disposed arm 29. The arm 29 is secured to a rod 30 and extends through the front wall of the transmission housing 13. A gear 31 is secured to the counter shaft 22 and is of a smaller dimension than the gear 23 and is continuously in mesh with the gear 24 so that when the gear 15 is in its normal or forward position, the gear 31 being fixed to the counter shaft 22 will drive the gear 24 and by having the clutch element 26 in engagement with the clutch element 25 the driven shaft 14 will be driven at a slower rate of speed than the drive shaft 4 to obtain intermediate or second speed to the transmission. A gear 33 of a larger dimension than the gear 24 is journaled to the driven shaft 14 and has formed thereon a clutch element 34 which is adapted to be engaged by a clutch element 35. The clutch element 35 is splined to the driven shaft 14 and has formed thereon a grooved member 36 which is engaged by a yoke 37 carried by a vertically disposed arm 38. The vertically disposed arm 38 is secured to a rod 39 that extends through the front wall of the transmission housing 13. The gear 40 is secured to the counter shaft 22 and is of a smaller diameter than the gear 31 and is continuously in mesh with the gear 33 so that when the gear 23 and the clutch element 35 are in engagement with the clutch element 34, the driven shaft 14 will be driven by the drive shaft 4 at a much decreased rate of speed so as to obtain first or low speed to the transmission. A gear 41 is journaled to the driven shaft 14 and has formed thereon a clutch element 42 which is adapted to be engaged by a clutch element 43 that is splined to the driven shaft 14. A groove member 44 is formed upon the clutch element 43 and has in engagement therewith the yoke 45 carried by a vertically disposed arm 46. The vertically disposed arm 46 is secured to the rod 47 and extends through the front wall of the transmission housing 13. A gear 47' is secured to the rear end of the counter shaft 22 and is in mesh with a pinion 48 which is journaled upon a suitable shaft 49 carried by the rear wall of the transmission housing 13. The pinion 48 is in mesh with the gear 41 whereby upon movement of the clutch element 43 in engagement with the clutch element 42 and with the gear 15 in mesh with the gear 23, the driven shaft 14 will be rotated in a reverse direction from the drive shaft 4 so as to obtain the reverse speed of the transmission. A plurality of standards 50 are secured to the bottom wall of the transmission housing 13 and have formed upon their upper ends bearings or journals 51 to receive the driven shaft 14 and the counter shaft 22 so as to firmly support them within the housing 13.

Substantially rectangular frames 52, 53, 54, and 55 are located in advance of the transmission housing 13 and have formed thereon arms 56 which connect the frames 52, 53, 54, and 55 to the rods 47, 39, 30 and 19 respectively. The rods 19, 30, 39 and 47 being slidably mounted within the front wall of the transmission housing 13 will support the frames in a horizontal plane in advance of the transmission housing, but if desired any other suitable supporting means may be provided to support the frames. Each of the frames are divided in half by vertical members 57. Shafts 58 and 59 extend through the halves of each of the frames and are journaled in suitable supporting arms 60 carried by the front wall of the transmission housing or casing 13. A pinion 61 is secured to one end of the shaft 59 and meshes with a segment 62 secured to the corresponding end of the shaft 58. The shaft 58 has secured thereto an arm 63 which is pivotally and slidably connected to a rod 64 which is in turn pivoted to the clutch pedal 9 as illustrated at 65, whereby upon pushing downwardly upon the clutch pedal to disengage the clutch elements 5 and 6 the shafts 58 and 59 will be rotated.

An operating member 66 is splined to the shaft 59 and within the frames and has formed thereon oppositely disposed flanges 67 and 68. The flange 68 has a centrally arranged notch 69 and the flange 67 has a notch 70 adjacent one end as clearly illustrated in Fig. 6 for the purpose of receiving the vertical members 57 and the ends of the frames during the operation of the device which will be hereinafter more fully described. A yoke member 71 is formed upon one end of the actuating member 66 and has in engagement therewith a yoke 72 carried by a collar 73 which is slidably mounted upon the shaft 59. The yoke 73 has formed thereon a downwardly depending arm which is pivoted to a rod 74. The rod 74 has formed thereon a rack bar 75 which extends transversely and upon the under side of the automobile body 1 and meshes with a pinion 76. The pinion 76 is secured to the lower end of an operating shaft 77 which extends through the quadrant 78 secured to the steering column 2 adjacent the steering wheel 3 as illustrated at 79. The upper end of the operating shaft 77 has secured thereto a controlling handle 80 which overlies the quadrant 78 and has formed thereon a tooth 81 adapted to engage the serrations or notches located in spaced relation upon the quadrant. The notches upon the quadrant have associated therewith the gears "R", "N", "1", "2", and "3" which represent "reverse", "neutral", first speed or lower speed, second speed or intermediate and third speed or direct drive.

The actuating member 82 is slidably mounted upon the shaft 58 and splined thereto and has formed thereon adjacent each end oppositely extending arms 83 and 84 which arms are located in alinement with the notches 70 and 69 respectively of the actuating member 66. The grooved member 85 formed upon one end of the actuating member 82 receives a yoke 85' carried by a collar 86 and is slidable upon the shaft 58. An arm 87 is formed upon the collar 86 and is secured to the rod 74 whereby the operating members 66 and 82 will be compelled to slide upon the shafts 59 and 58 respectively upon actuation of the controlling handle 80 upon the quadrant 78.

The gears 15, 24, 33, and 41 are formed upon sleeves 88 and the sleeves that carry the gears 24, 33, and 41 are rotatably mounted upon the driven shaft 14 while the sleeve that carries the gear 15 is splined to the drive shaft 4. In operation, the controlling lever 80 is positioned in the notch bearing the character "R" representing reverse to the transmission and when in this position, the actuating member 82 is so positioned upon the shaft 58 that the arm 83 is disposed within the frame 52 and the actuating member 66 is so positioned upon the shaft 59 that the notch 70 is in a line with the vertical member 57 of the frame 52. The operator then presses downwardly upon the clutch pedal 9 and the first movement thereof disengages the clutch element 5 from the clutch element 6 stopping the rotation of the drive shaft 4 and upon further movement downwardly of the clutch pedal 9 the actuating members 66 and 82 are rotated so that the flanges and arms thereof are disposed in a horizontal plane as illustrated in Fig. 1. When the arm 83 of the actuating member 82 moves into a horizontal position it engages the vertical member 57 of the frame 52 and moves the same rearwardly causing the rod 47 to move rearwardly connecting the clutch element 43 with the clutch element 42 and by letting up on the foot pedal 9 the clutch elements 5 and 6 move in engagement with each other permitting the prime mover to rotate the shaft 4 which drives the counter shaft 22 through the gears 15 and 23. The counter shaft drives the pinion 48 which in turn drives the gear 41 which drives the driven shaft 14 in a reverse direction from the drive shaft 4, thus obtaining the reverse of the transmission. When the operator releases the foot pedal 9 permitting the same to return to its initial position, the flanges and arms of the actuating members 66 and 82 return to a vertical position as illustrated in Fig. 2.

To obtain first or low speed to the transmission, the controlling lever 80 is moved so that the tooth 81 engages the notch 1 upon the quadrant 78 which positions the actuating member 82 in such a manner upon the shaft 58 that the arm 84 will be disposed within the frame 53 and simultaneously moving the arm 83 out of alinement with the frame 52 and at the same time the actuating member 66 moves laterally upon the shaft 59 positioning the notch 69 in alinement with the frame 53. The operator then presses downwardly upon the clutch pedal 9 disengaging the clutch element 5 from the clutch element 6 and upon further movement thereof, the actuating members 66 and 82 are rotated upon the shafts 59 and 58. Upon rotation of the actuating member 82 the arm 84 moves the frame 53 rearwardly causing the clutch element 35 to engage with the clutch element 34. Upon rotation of the actuating member 66, the frame 52 is moved forwardly disengaging the clutch element 43 from the clutch element 42 thereby returning the reversing mechanism to neutral position. Owing to the pinion 61 meshing with the segment 62 the actuating members 66 will be rotated at a faster rate of speed than the actuating member 82 so that the frame 52 is moved forwardly prior to the frame 53 being moved rearwardly by the arm 84 thus overcoming the danger of two or more clutches of the transmission being in mesh at one time.

To obtain intermediate or second speed to the transmission, the controlling lever 80 is moved so that the tooth 81 engages the notch bearing the character "2" upon the quadrant 78 which slides the actuating members 66 and 82 laterally upon the shafts 59 and 58 respectively positioning the rim 84 within the frame 54 and the notch 69 in alinement with said frame whereby upon the operator actuating the foot pedal 9 in the manner heretofore described, the frame 53 is moved rearwardly throwing the transmission out of low or first speed and moving the frame 54 rearwardly to connect the clutch elements 26 and 25 to obtain the intermediate or second speed.

To obtain third speed or high, the controlling lever 80 is moved to the character "3" upon the quadrant 78 which positions the arm 83 within the frame 55 and the notch 70 in alinement therewith and upon actuation of the foot pedal the frame 54 is moved forwardly disconnecting the clutch elements 25 and 26 and the arm 83 moves the frame 55 rearwardly causing the gear 15 to disengage from the gear 23 and move the clutch element 20 in engagement with the clutch element 21 establishing a direct drive from the drive shaft 4 to the driven shaft 14. To place the transmission in neutral, the controlling lever 80 is moved to the character "N" upon the quadrant 78 which positions the arms 84 and 83 between the frames 52 and 53 and upon actuation of the foot pedal the operating members 66 turns any of the frames to their neutral position that may be in operative position thus placing the transmission in neutral.

From the foregoing description taken in connection with the accompanying drawings it will be noted that the gear shifting mechanism can be readily employed in connection with various types of transmission and of the selective type.

While I have shown and described the preferred embodiment of my invention, it will be understood that minor changes in construction, combination, and arrangement of parts may be made without departing from the spirit and scope of the invention as claimed.

Having thus described my invention, what is claimed is:—

1. A device of the character set forth comprising a housing, a drive and driven shaft in said housing, a counter shaft in said housing, a plurality of gears carried by the counter shaft and varying in sizes, a gear splined to the drive shaft and normally in mesh with one of the gears of the counter shaft, a clutch element carried by said gear, a clutch element secured to the driven shaft, means disengaging the last named gear from one of the first named gears and simultaneously moving the clutch elements in engagement with each other to obtain a direct drive from the drive shaft to the driven shaft, a pair of gears journaled upon the driven shaft and in mesh with a pair of the first named gears, clutch elements carried by said pair of gears, clutch elements splined to the driven shaft and adapted to be moved in engagement with the last named clutch elements to obtain first and second speeds, a pinion journaled in said housing and in mesh with one of the first named gears, a gear journaled to the driven shaft and in mesh with the pinion, a clutch element formed on the last named gear, a clutch element splined to the driving shaft and adapted to engage the last named clutch element to obtain reverse to the transmission.

2. A device of the character set forth comprising a transmission, a plurality of controlling rods for said transmission, frames connected to said rods, vertical members in said frames dividing them into a pair of sections, shafts extending through the sections of the frames, an operating member upon one of said shafts and adapted to engage any one of the frames for moving the respective controlling rod into operative position, a second controlling member slidable on the other shaft and adapted to return and hold the remaining frames in neutral position, means operating said controlling members, and means actuating said controlling members to cause them to move the frames.

3. A device of the character set forth comprising a transmission, controlling rods for said transmission, frames connected to said rods, shafts extending through said frames and rotatably mounted, a controlling member on one of said shafts, oppositely extending arms on said controlling member, a second controlling member on the other shaft, flanges formed on the second controlling member, and having oppositely extending notches in alinement with the arms, means simultaneously moving the controlling members so as to position one of the arms in one of the frames with one of the notches in alinement with said frame, and means rotating the controlling members.

4. A device of the character set forth comprising a transmission, controlling rods for said transmission, frames connected to said controlling rods, shafts extending through said frames and rotatably mounted, an operating member splined to one of said shafts, oppositely extending arms formed on said member, a switch operating member splined to the other shaft, oppositely disposed flanges on the switch operating member and having flanges in alinement with the arms, a controlling means, means connecting the controlling means with the operating members to position one of the arms within one of the frames and with one of the notches in alinement therewith, a pinion secured to one of said shafts, a segment secured to the other shaft and in mesh with said pinion, and means connecting one of the shafts to the foot pedal of an automobile for rotating said shafts upon actuation of said foot pedal.

In testimony whereof I affix my signature in presenece of two witnesses.

WILLIAM J. THOMPSON.

Witnesses:
CHAS. E. TUPPER,
J. D. BERCON.